United States Patent [19]

Pike

[11] Patent Number: 4,935,265

[45] Date of Patent: Jun. 19, 1990

[54] METHOD FOR COATING FIBERS WITH AN AMORPHOUS HYDRATED METAL OXIDE

[75] Inventor: Roscoe A. Pike, Granby, Conn.

[73] Assignee: United Technologies Corporation, Hartford, Conn.

[21] Appl. No.: 285,999

[22] Filed: Dec. 19, 1988

[51] Int. Cl.$^5$ ............................................. B05D 3/02
[52] U.S. Cl. .................................. 427/226; 427/376.2; 427/419.2; 427/419.5
[58] Field of Search ................. 427/226, 376.2, 385.5, 427/419.2, 419.5, 407.1, 407.3; 264/136

[56] References Cited

U.S. PATENT DOCUMENTS

| | | | |
|---|---|---|---|
| 4,376,804 | 3/1983 | Katzman | 427/226 |
| 4,382,104 | 5/1983 | Smith et al. | 427/226 |
| 4,678,820 | 7/1987 | Pike | 523/200 |

FOREIGN PATENT DOCUMENTS 59-182991  10/1984  Japan ................. 427/376.2

*Primary Examiner*—Sadie Childs

[57] ABSTRACT

A method of coating a fiber resulting in a more oxidative resistant fiber. The method comprises mixing metal alkoxides and basic metal carboxylates in amounts such that the metal alkoxides are substantially water soluble. The basic metal carboxylate has the formula:

$$R'-CO_2M'(OH)_n \cdot zH_mX$$

where
(i) $R'$ is an organic radical;
(ii) $M'$ is any metal that has a valence of 3 or 4;
(iii) X is $BO_3^-$, $SO_4^=$, $Cl^-$, $NO_3^-$, $R''CO_2^-$, where $R''$ is an organic radical;
(iv) n and m correspond to the valence of $(M'-1)$ and X respectively; and
(v) Z has a value sufficient so that said $R'-CO_2M'(OH)_n$ is substantially water soluble.

A layer of the solution is applied to the fiber and the fiber is exposed to a temperature sufficient to form an oxide surface. The fibers can be used to make polymeric composites. Fibers having the above-described coating are impregnated with a resin, stacked in layers and exposed to pressure and optional heat.

8 Claims, No Drawings

METHOD FOR COATING FIBERS WITH AN AMORPHOUS HYDRATED METAL OXIDE

DESCRIPTION

Cross Reference to Related Application

Attention is directed to commonly assigned copending application Ser. No. 286,000, entitled "Oxidatively Stable Amorphous Hydrated Metal Oxide Sizing for Composite Fibers", filed on even date herewith, which discloses material similar to that used in the present application, the disclosure of which is hereby incorporated by reference.

Technical Field

The field of art to which this invention pertains is composites and methods for making composites.

Background Art

Weight saving and manufacturing cost benefits have led to the increase in use of organic matrix fiber reinforced composite structures in the aircraft and aerospace industries. In order to be a viable alternative to metal these composites should maintain the strength typical of conventional structural systems. In many applications composites are put under a variety of environmental and mechanical stresses. For example, frequently these composites are exposed over long periods of time to elevated temperatures which can result in a loss of composite properties. The loss of properties can result from heat induced microcracks that allow oxygen to attack the fibers. As a result of this deficiency, extensive research and development efforts have been undertaken to define methods and identify materials which improve composite performance at elevated temperatures. For example, it is known that surface preparation of fibers can be important in the formation of composites. Thus, the fiber can be coated with an organic sizing agent to produce a surface which combines with the resin to develop the strengths which meet application requirements and allow improved handling characteristics such as weaveability. A variety of sizing agents have been used to produce improved bondability and handleability including epoxy, polyimide and polyvinylacetate polymers. In particular, commonly assigned U.S. Pat. No. 4,678,820, the disclosure of which is hereby incorporated by reference, describes an amorphous hydrated metal oxide primer that provides improved composite wet strength. In that patent, metal oxides are formed from metal alkoxides that were hydrolyzed on the fiber surface when applied from an organic solvent system.

In the field of sol-gel processes, it is generally known that metal oxides can also be formed by exposing water hydrolyzable metal alkoxides to acidic or basic conditions. Although the above surface preparations have provided advantages, there is a need for new technology to aid in the advancement of lightweight aerospace-type composite structures.

Accordingly, there is a constant search in this field of art for new methods of providing lightweight, structurally sound composites.

Disclosure of Invention

This invention is directed to a method of coating a fiber resulting in a more oxidative resistant fiber. The method comprises mixing metal alkoxides and basic metal carboxylates in amounts such that the metal alkoxides are substantially water soluble. The basic metal carboxylate has the formula $$R'-CO_2M'(OH)_nzH_mX$$

where
(i) R' is an organic radical;
(ii) M' is any metal that has a valence of 3 or 4;
(iii) x is $BO_3^-$, $SO_4^=$, $Cl^-$, $NO_3^-$, $R''CO_2^-$, where R'' is an organic radical;
(iv) n and m correspond to the valence of (M'—1) and x respectively; and
(v) Z has a value sufficient so that said $R'-CO_2M'(OH)_n$ is substantially water soluble.

A layer of the solution is applied to the fiber and the fiber is exposed to a temperature sufficient to form an oxide surface.

Another aspect of this invention relates to polymeric composites that are more oxidatively stable. Fibers having the above-described coating are impregnated with a resin, stacked in layers and exposed to pressure and optional heat.

This amorphous hydrated metal oxide primer for composite fibers provides improved oxidation resistance at elevated temperatures. Thus, this invention makes a significant advance to the aerospace industry by providing new technology relating to structural composites.

Other features and advantages will be apparent from the specification and claims.

BEST MODE FOR CARRYING OUT THE INVENTION

Any metal alkoxide that hydrolyzes to give an amorphous hydrated metal oxide (i.e. a monohydroxy metal oxide) may be used in the practice of this invention. Metal alkoxides having the formula $M_x(OR)_y$ where x is 1 and y is 2, 3 or 4 are preferred in forming the metal oxide primer of this disclosure, y being determined by the particular valence of the metal. Typically, a valence of at least 3 is preferable to form a monohydroxy metal oxide. However, alkoxides where y is 2 are preferably combined with alkoxides having higher y values. M is any metal capable of forming a stable alkoxide, which can be purified by, for example, distillation or crystallization without decomposition; as y is defined above essentially all metals meet this requirement. It is preferred that the metal is selected from the group consisting of titanium, boron, silicon, nickel, iron, magnesium, and aluminum or combination thereof. It is especially preferred that M is aluminum. Typically, R can be any organic radical that can be distilled at temperatures below about 300° C. Since the alkoxide (—OR moiety) is not incorporated into the primer, the important criteria associated with it is that the resultant alcohol can be volatilized at temperatures that are not high enough to damage the sizing or substrate. It is preferred that R is an alkane radical from $C_1$ to $C_{10}$. It is especially preferred that R is methyl, ethyl, propyl or sec-butyl as these radicals are volatilized as alcohols at relatively low temperatures. In addition, the alkoxides can be modified by incorporation of varying amounts of additives such as phosphate, silicate or magnesium oxide without affecting the size properties. Mixtures of the above metal alkoxides may also be used in the practice of this invention. In addition, partial hydrolyzates of the metal alkoxides can also be used as starting material, i.e., dimers, trimers, etc. of the monomeric alkoxides.

The above-described metal alkoxide is combined with a solubilizing compound that makes the metal alkoxide hydrolyzate substantially (preferably completely) water soluble, increases the rate of peptization (colloidal solution formation) and ultimately leads to the formation of a high temperature stable metal oxide. Preferably, such compounds are basic metal carboxylates having the formula:

$$R'-CO_2M'(OH)_n \cdot zH_mX$$

where:
R' is H, or $CH_3$ to $C_8H_{17}$;
M' is any metal that has a valence of 3 or 4;
X is $BO_3^-$; $SO_4^=$; $Cl^-$; $NO_3^-$; $R''CO_2^-$, where R'' is H, or $CH_3$ to $C_8H_{17}$;
n and m correspond to the valence of (M'−1) and X respectively; and
Z has a value sufficient so that the acid $H_mX$ makes the basic metal carboxylate $(R'-CO_2M'(OH)_n)$ substantially water soluble.

The acid $H_mX$ may also act as a buffer to stabilize the pH of the system which results in a stable colloidal solution. As before, it is preferred that M' is titanium, silicon, nickel, zirconium and aluminum or combinations thereof. It is especially preferred that M is aluminum.

As with the alkoxide R' can be any organic radical that can be distilled at temperatures below about 300° C. Since the ester moiety is not incorporated into the sizing agent, the important criteria associated with it is that the resultant acid can be volatilized at temperatures that are not high enough to damage the substrate. It is especially preferred that R' is methyl, ethyl, propyl, or sec-butyl as these radicals are volatized as acids at relatively low temperatures. Mixtures of the above metal esters may also be used in the practice of the invention. As before, partial hydrolyzates of the metal esters may also be used as starting material.

An especially preferred metal alkoxide solubilizing compound is basic aluminum acetate stabilized with boric acid. This stabilizing compound is available as $CH_3CO_2Al(OH)_2 \cdot \frac{1}{3}H_3BO_3$ from Aldrich Chemical Company. The compound effectively solubilizes a metal alkoxide without the addition of free acids, i.e., HCl, $HNO_3$, acetic, etc. eliminating the storage and handling of corrosive substances. The boric acid acts as a buffer in the hydrolyzed system which produces a colloidal solution having extended life storage stability and a pH in the range of about 4 to about 5.

An amount of the solubilizing compound sufficient to substantially solubilize the metal alkoxide is used. However, it is preferred that the metal alkoxide is completely solubilized. Typically, this is about (by weight proportion, metal alkoxide/solubilizing compound) 20/1 to about 1/1. Above about 20/1, precipitation of an insoluble oxide occurs, and below about 1/1, an oxide of lower thermal stability can be formed. For the above described stabilized basic aluminum acetate compound, about 2/1 to about 16/1 is used to solubilize aluminum alkoxides.

The above metal alkoxides when combined with the solubilizing agents produce essentially clear colloidal solutions of the hydrated oxide.

An exemplary reaction believed to occur is that of aluminum alkoxide to hydrated alumina. It is believed that the initial hydrolyzation reaction of aluminum alkoxides is empirically illustrated as $$H_2O + (RO)_3Al + CH_3-C-O_2-Al-(OH)_2 \cdot \tfrac{1}{3}H_3BO_3$$

$$(RO)_2Al-OH + Al(OH)_3 + CH_3-C-O_2H + ROH + H_3BO_3$$

and $$(RO)Al(OH)-O-Al(OH)_2 + H_2O + ROH$$

and

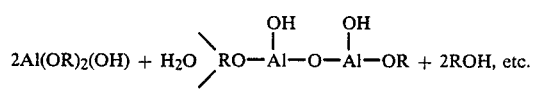

and $$OH[(OH)AlOAl(OH)OAl(OH)]_x + ROH + H_2O$$

These reactions proceed rapidly with further hydrolyzation-polymerization to incorporate n aluminum ions, i.e., $Al_nO_{n-1}(OH)_{(n+2)-x}(OR)_x$ assuming linear polymerization for simplicity. As the reaction proceeds the number of OR groups, i.e., x, relative to n decreases to a value depending on the hydrolysis temperature and available moisture concentration. Under normal application conditions, the ratio of residual OR groups as designated by x is less than 4 and n is 28 or greater. Such low levels of —OR do not impede the performance of the sizing agent. In addition, $B_2O_3$ is believed incorporated into the polymer structure to ultimately produce a mixed oxide at elevated temperature. In contrast, zirconium alkoxide is believed to hydrolyze to a hydrated oxide, i.e. $ZrO_2$ 1.7 $H_2O$ having no residual —OR or —OH groups.

The thickness of this sizing agent layer can vary effectively from about 1.5 nanometers (nm) to about 1000 nm. Above about 1000 nm, the layer can be so thick as to create stress risers and become brittle making the fiber stiff and difficult to handle. Below about 2 nm, the layer does not provide the properties such as stress transfer at the levels typically required. In addition, it is preferable to apply the size to the fiber surface with a plurality of layers of metal alkoxide as this facilitates removal of volatiles and solvent which can be more difficult to achieve from a single thick application.

Any fiber may be used in the practice of this invention that is useful for making composite articles. Examples include polyaramid, carbon, boron, alumina, metal, glass and silicon carbide. Preferably graphite or glass fibers are used as these provide the properties most desired of composites such as strength and light weight.

Any conventional resin matrix can be used for the practice of this invention that is useful for making composite articles. However this thermally stable coating is particularly useful where the coated glass or graphite fiber is used to reinforce high temperature resin matrix composites (i.e., phenolic, carbon/carbon, bis-maleimide, polyimide or fibers used to reinforce advanced engineering thermoplastic composites (i.e., PEEK TM resin (ICI America, Wilmington, Del.), ULTRAPEK TM resin (BASF, Ludwigshafen, West Germany), RYTON TM resin (Phillips Petroleum, Bartlesville, Okla.), TORLON TM resin (Amaco, Naperville, Ohio), SUPEC TM resin (General Electric, Pittsfield, Mass.), and ULTEM TM resin (General Electric, Pittsfield, Mass.).

Any metal alkoxide may be combined with any solubilizing agent or any fiber. However, it is preferred to combine Al alkoxide with boric acid stabilized Al acetate and graphite fibers. It is especially preferred to combine alumina with boria on graphite fibers in a ratio of approximately 9 $Al_2O_3.2B_2O_3$.

This size may be used to advantage in a wide range of composites. For example, chopped fiber filament wound and ordered fiber composites benefit from this sizing agent.

Any method of making a composite may be used for the practice of this invention that provides composites having reinforcing amorphous hydrated metal oxide coated fibers. For example, a chopped fiber composite can be made by mixing chopped fibers coated with amorphous hydrated metal oxide and resin in a mold under pressure and optional heat. However, it is preferred to apply a coating of the metal alkoxide to the carbon fibers by drawing the fiber through an aqueous solution of the hydrated metal oxide. The hydrated metal oxide coated composite fibers are then maintained at a temperature of about 25° C. to about 400° C. as below 25° C. the reaction kinetics are typically too slow and above 400° C. loss of desirable fiber properties or size crystallization may occur with an accompanying shrinkage and embrittlement leading to loss of mechanical properties. It is especially preferred to heat the metal oxide coated fibers to a temperature of about 100° C. to about 250° C. as the lower temperatures minimize the risk of mechanical property degradation of fibers. Surprisingly, an increase in temperature from room temperature (R.T.) to about 325° C. does not affect an increase in metal oxide conversion to amorphous hydrated metal oxide.

It is also preferred, particularly with graphite fibers, to use a low surface tension water solution to insure good wetting and spreading of the size on the fiber surface. It is especially preferred to use a water solution that has a surface tension below about 40 dynes/cm. This can be achieved, for example, by the addition to the hydrosol of sufficient amounts of a surfactant such as NP-14 TM surfactant (Union Carbide) or FSN TM surfactant (E. I. DuPont DeNemours).

Once coated with amorphous hydrated metal oxide, the reinforcing carbon fibers (tows) are dipped into the matrix resin solution to form a tape prior to the molding step. Typically, the resin impregnated fibers are allowed to dry so that any solvent will evaporate. The graphite tape can then be cut into plies (layers of impregnated fibers) of the desired dimensions of the article to be fabricated. The plies are then stacked to create the desired thickness typically in metal molds coated with mold release agent such as MICRO SPRAY TM (Micro-Spray Products Inc.). The assembled ply layup is then placed in a press and exposed to pressures and temperatures conventional for the resin system used and application desired.

EXAMPLE 1

8 grams of sec-butyl alkoxide (ICI-Stauffer, Westport, Conn.) and 0.5 gram of $CH_3CO_2Al(OH).\frac{1}{3}H_3BO_3$ were heated with stirring in 60 cc of distilled water 16 hours at 80°-90° C. The resulting nearly clear solution had a pH of 4.25 at room temperature. A portion of that clear solution was diluted to a 3% weight % solution with distilled water and was applied to graphite and glass fibers. The coated fibers were dried in a stream of hot air at 250° C. The resulting coating was about 2.5 nm thick as measured by Auger spectroscopy. The coated fiber tow was flexible and spreadable allowing good handling characteristics. The resulting fibers were tested for oxidation resistance and the results are detailed below.

Tables 1 and 2 below illustrate that the oxide coating described herein provides oxidation resistance for graphite fibers and hence composites made therefrom at elevated temperatures.

TABLE 1

| Thermogravimetric Analysis (TGA) of G40-600 TM Graphite Fiber (BASF)[a] | | |
|---|---|---|
| BASF Surface Treatment | Oxide Sizing | 50% Wt. Loss Temp., °C. |
| Yes | No | 710.9 |
| Yes | Yes | 865.38 |
| No | No | 709.8 |
| No | Yes | 770.5 |

[a]Tested at 10° C. min in air using 50 cc/min flow

TABLE 2

| Isothermal Weight Loss of G40-600 TM Graphite Fiber (BASF) | | |
|---|---|---|
| BASF Surface Treatment | Oxide Sizing | Wt. Loss, wt. % at 375° C./24 hrs. |
| Yes | No | 1.0 |
| Yes | Yes | 0.13[b] |
| Yes | Yes | 0.02[c] |
| No | No | 10.28 |
| No | Yes | 0.35 |

[a]Rate 10° C./min to 375° C., hold 24 hours. Air flow 50 cc/min.
[b]Weight loss from 275° C., RT to 275° C. weight loss assumed to be due to water loss.
[c]Predried at 250° C.

A less preferred method of forming the sizing agent is described below. The method is less preferred because the boron alkoxide is more sensitive to moisture making it more difficult to handle. In addition, the method requires the handling of free acid.

EXAMPLE 2

4 grams of sec-butylaluminum alkoxide, 1 gram of ethyl borate, 50 cc of distilled water and 3 cc of concentrated acetic acid were heated with stirring at 80°-85° C. for 48 hours resulting in an essentially clear colloidal solution of hydrated aluminum/boron hydrated oxide at a pH of 4.1. Graphite fiber was drawn through the above solution and the resultant coated fiber dried in a stream of hot air 200° C. to produce an oxide coated flexible fiber having good handling characteristics.

This invention provides a unique method to produce a stable colloidal solution of a hydrated metal alkoxide which on application to a surface produces an oxide coating which has been found to improve the oxidation resistance of graphite fiber. Because of its thermal stability the inorganic size can be used equally as well with high temperature resins such as polyimides or with low temperature resins such as epoxy systems unlike organic sizing agents which are typically temperature specific. This coating provides improved oxidation resistance retention in elevated temperature environments. The inorganic primers can be utilized in lower amounts than the 1.0 wt. % percent coating level typical of organic sizes. Thicker layers tend to set up stress risers and to form a weak boundary layer as the components segregate.

It is also believed that composites using the inorganic sized fibers will have improved wet strength retention, be less subject to microcracking and exhibit improved fracture toughness and impact strength properties. Also, the inorganic insulating sheath will have little, if any, deleterious effect on electrical equipment (e.g., cause shorting) should such a composite disintegrate.

This invention provides an amorphous hydrated metal oxide primer for fiber reinforced composites resulting in improved oxidation resistance. Thus, it makes a significant advance in the aerospace industry by providing new technology relating to composites.

It should be understood that the invention is not limited to the particular embodiments shown and described herein, but that various changes and modifications may be made without departing from the spirit and scope of this novel concept as defined by the following claims.

I claim:

1. A method for coating a fiber comprising
   (a) mixing $M_xOR_y$ and $R'-CO_2M'(OH)_n.zH_mX$ in amounts to form a solution such that $M_xOR_y$ is substantially water soluble wherein:
      (i) M is any metal that has a valence of 2, 3 or 4;
      (ii) R is an organic radical;
      (iii) x is 1;
      (iv) y is 2, 3 or 4;
      (v) R' is an organic radical;
      (vi) M' is any metal that has a valence of 3 or 4;
      (vii) X is $BO_3^-$, $SO_4^=$, $Cl^-$, $NO_3^-$, $R''CO_2^-$, where R'' is an organic radical;
      (viii) n and m correspond to the valence of (M'−1) and X respectively; and
      (ix) Z has a value sufficient so that said $R'-CO_2M'(OH)_n$ is substantially water soluble.
   (b) applying a layer of said solution to the fiber; and
   (c) exposing the fiber to a temperature sufficient to form an oxide surface.

2. The method as recited in claim 1 wherein M is selected from the group consisting of nickel, iron, titanium, aluminum, zirconium and silicon.

3. The method as recited in claim 1 where in M is aluminum.

4. The method as recited in claim 1 wherein at least one of the compounds $M_xOR_y$, $R'-CO_2M'(OH)_n.zH_mX$ is partially hydrolyzed.

5. A method for making a fiber reinforced polymeric matrix composite material by impregnating the fibers with a resin, stacking layers of the resin impregnated fibers, and pressing the stacked impregnated fibers with optional heat wherein the improvement comprises:
   (a) mixing $M_xOR_y$ and $R'-CO_2M'(OH)_n.zH_mX$ in amounts to form a solution such that $M_xOR_y$ is substantially water soluble wherein:
      (i) M is any metal that has a valence of 3 or 4;
      (ii) R is an organic radical;
      (iii) x is 1;
      (iv) y is 3 or 4;
      (v) R' is an organic radical;
      (vi) M' is any metal that has a valence of 3 or 4;
      (vii) X is $BO_3^-$, $SO_4^=$, $Cl^-$, $NO_3^-$, $R''CO_2^-$, where R'' is an organic radical;
      (viii) n and m correspond to the valence of (M'−1) and X respectively; and
      (ix) Z has a value sufficient so that said $R'-CO_2M'(OH)_n$ is substantially water soluble;
   (b) applying a layer of said solution to the fiber prior to impregnation with the resin; and
   (c) exposing the fiber having a layer of metal alkoxide to a temperature sufficient to form an oxide surface prior to impregnation with the resin.

6. The method as recited in claim 5 wherein M is selected from the group consisting of nickel, iron, titanium, aluminum, zirconium and silicon.

7. The method as recited in claim 5 wherein M is aluminum.

8. The method as recited in claim 5 wherein at least one of the compounds $M_xOR_y$, $R'-CO_2M'(OH)_n.zH_mX$ is partially hydrolyzed.

* * * * *